United States Patent [19]

Antkowiak

[11] 4,441,145

[45] Apr. 3, 1984

[54] TRACKING MEANS FOR MOVING A LIGHT SOURCE ACROSS A PLANTER SURFACE TO SIMULATE SUNLIGHT

[75] Inventor: Russell J. Antkowiak, Tempe, Ariz.

[73] Assignee: Aqua Culture, Inc., Tempe, Ariz.

[21] Appl. No.: 410,405

[22] Filed: Aug. 23, 1982

[51] Int. Cl.³ .............................................. B60Q 1/12
[52] U.S. Cl. ..................... 362/384; 362/1; 362/122; 362/145; 362/147; 362/286; 362/386; 362/391; 362/404; 362/407; 362/418; 362/428; 362/430; 362/805
[58] Field of Search ................... 362/1, 122, 391, 384, 362/404, 407, 418, 419, 430, 805, 145, 147, 286, 386, 428

[56] References Cited

U.S. PATENT DOCUMENTS 2,858,381 10/1958 Goldberg et al. .............. 362/407 X
4,316,238 2/1982 Booty et al. .................... 362/391 X Primary Examiner—Stephen J. Lechert, Jr.
Attorney, Agent, or Firm—Warren F. B. Lindsley

[57] ABSTRACT

An improved lighting system for growing plants indoors, the lighting system comprising a means for continuously moving a high intensity light over the plants in a cyclic manner simulating daily exposure to the sun in a natural environment.

4 Claims, 5 Drawing Figures

U.S. Patent
Apr. 3, 1984
4,441,145
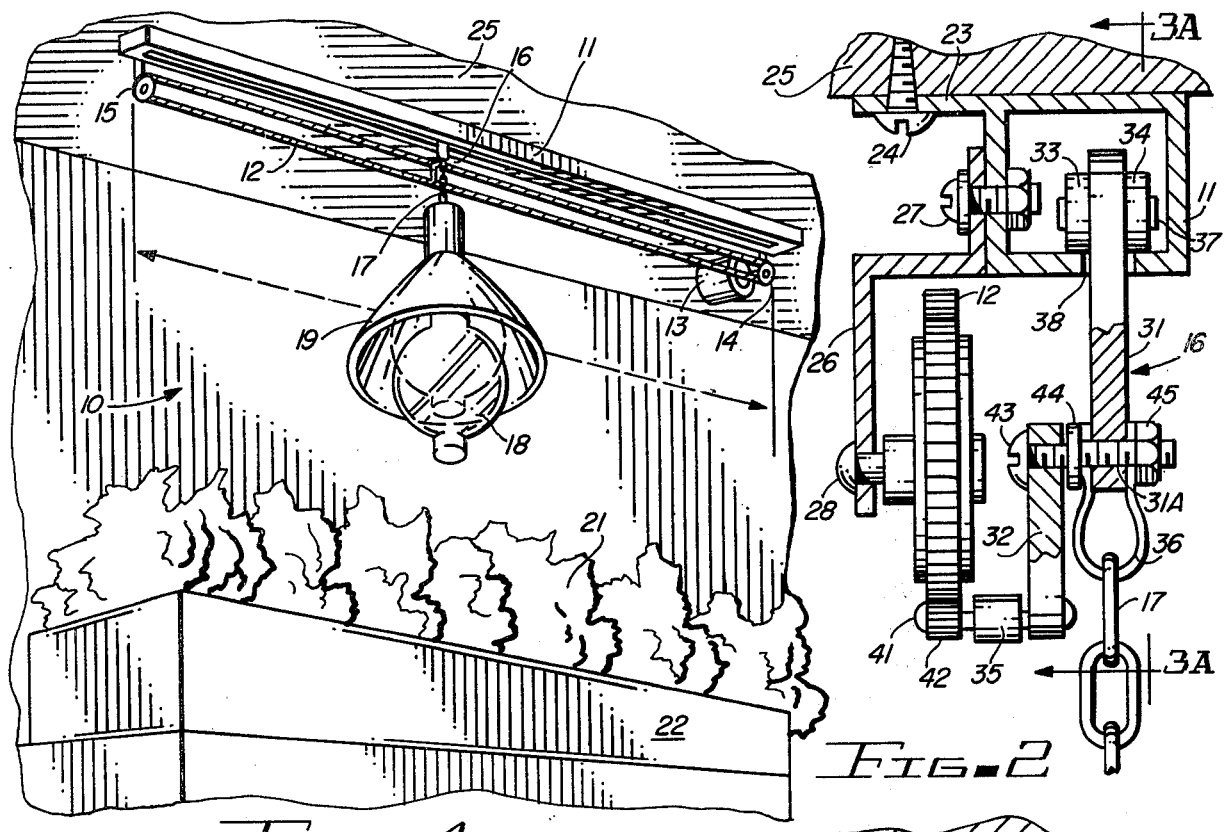
Fig. 1
Fig. 2
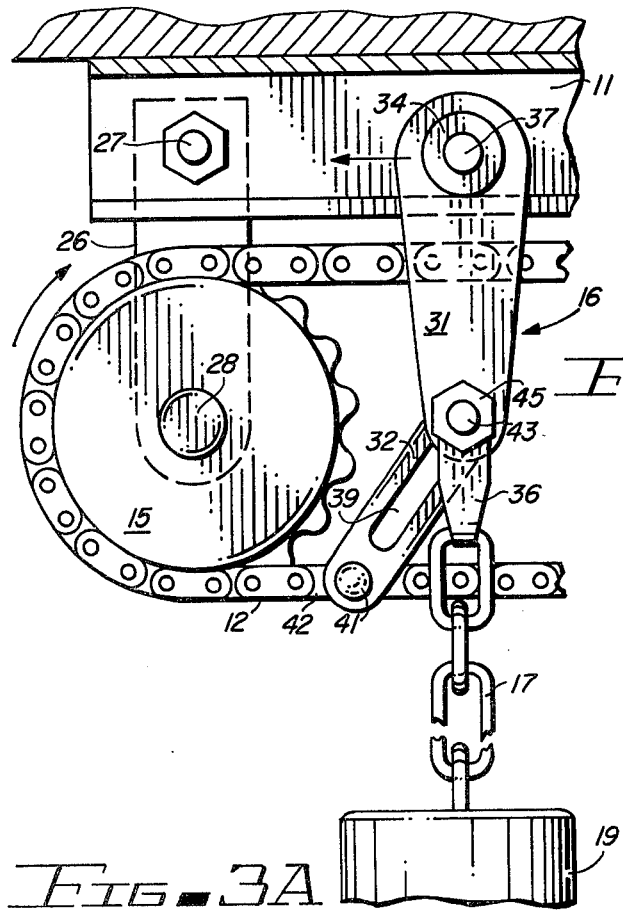
Fig. 3A
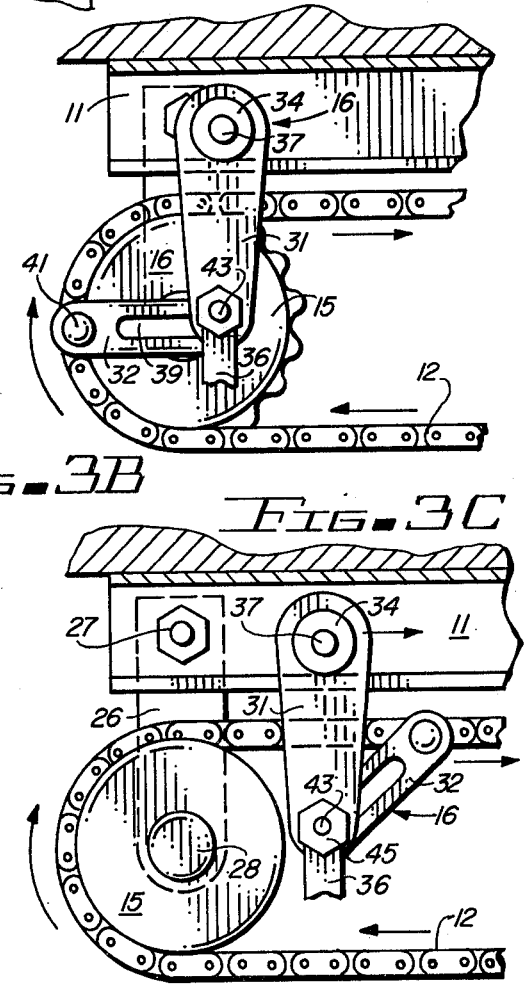
Fig. 3B
Fig. 3C

TRACKING MEANS FOR MOVING A LIGHT SOURCE ACROSS A PLANTER SURFACE TO SIMULATE SUNLIGHT

BACKGROUND OF THE INVENTION

The metal halide lamp has been found to be an efficient light source for use in growing plants indoors. The Westinghouse Electric Corporation offers a metal halide lamp for sale which provides an initial efficacy of 125 lumens per watt. A 1000 watt version of this lamp is said to produce more light output than three 1500 watt incandescent lamps or two 1000 watt mercury lamps. Moreover, the light spectrum produced by the lamp is highly satisfactory for plant growth.

If a reasonable return is to be realized from an investment in lamps of this type, they must be applied effectively. Ideally, the application should simulate as nearly as possible the natural conditions under which plant growth is sustained in nature.

A number of points may be noted concerning natural conditions of lighting as afforded by the sun. First, most plants require for at least a part of the day the full intensity of the sun's rays as experienced when the sun passes overhead. During the remainder of the day as the sun rises and sets, varying levels of intensity are acceptable, including periods of complete darkness. Secondly, it is desirable that the position of the light source should not be fixed relative to the plant. The rising and setting of the sun in the natural plant environment permits exposure of the lower leaves and penetration of light to the interior of the plant structure as the angle of incidence changes. Finally, the rotation of the earth permits the utilization of the single light source (the sun) as a means for sustaining growth all over the earth.

DESCRIPTION OF THE PRIOR ART

Various types of artificial light sources have been utilized for sustaining indoor plant growth. Arrangements employing a moving light source for the simulation of natural solar lighting, as taught in the present invention, are believed to be new.

SUMMARY OF THE INVENTION

In accordance with the invention claimed, an improved lighting system is provided for promoting indoor plant growth and is designed to simulate the natural conditions of solar lighting as experienced by plants growing out of doors.

It is, therefore, one object of the present invention to provide an improved lighting system for sustaining indoor plant growth.

Another object of this invention is to effectively utilize in an indoor plant lighting system an efficient, high intensity light source.

A further object of the invention is to provide in such a system a variation in the light intensity delivered to individual plants whereby the maximum and minimum approximate the maximum and minimum levels of sunlight experienced by plants in their natural environment.

A still further object of this invention is to provided an improved indoor lighting system wherein the angle of incidence of the light rays recieved by the individual plants varies with time as an approximation of the natural conditions resulting from the rising and setting of the sun.

A still further object of this invention is to provide an improved indoor lighting system for plants employing a single lamp to supply the necessary light energy for a large number of plants.

A still further object of this invention is to accomplish the foregoing objects by moving a light source cyclically past a large number of plants so that all of the plants served by the light source are exposed to the desired variations in both light intensity and angle of incidence.

A still further object of this invention is to provide a new and improved light source utilizing a maximum degree of energy efficiency.

Further objects and advantages of the invention will become apparent as the following description proceeds; and the features of novelty which characterize this invention will be pointed out with particularity in the claims annexed to and forming a part of this invention.

BRIEF DESCRIPTION OF THE DRAWING

The present invention may be more readily described with reference to the accompanying drawing, in which:

FIG. 1 is a perspective view of an improved lighting system for indoor planters and embodying the invention;

FIG. 2 is a partially cut-away view of one end of the lamp conveyor of the system shown in FIG. 1; and FIGS. 3A, 3B and 3C are side views of one end of the conveyor shown in FIG. 1 and in successive positions of the lamp support carried by the conveyor chain.

DESCRIPTION OF THE PREFERRED EMBODIMENT

Referring more particularly to the drawing by characters of reference, FIGS. 1-3 disclose an improved lighting system 10 for indoor planters comprising an elongated frame forming a track or rail 11, a conveyor chain 12, an electric motor 13, a drive sprocket 14, an idler sprocket 15, a carriage or carrier assembly 16, a lamp support chain 17, a lamp 18 and a lamp shade or reflector 19. The system 10 is employed to provide lighting for plants 21 growing in an indoor planter 22.

Rail 11 may be fashioned from a hollow aluminum extrusion having a generally rectangular cross-sectional configuration. The exposed bottom face of the extrusion has a longitudinal slot extending along its center line. The inside surface of this slotted face forms the track or rail surface of the carrier assembly, as shown in FIGS. 2, 3A and 3C. A length of this rail appropriate to the particular indoor planter involved is secured to the ceiling or other overhead structure above the planter for which lighting is to be provided. An extending flange 23 of rail 11 may be provided for mounting purposes. Screws 24 passing through holes in flange 23 may be employed to secured the rail to ceiling 25 with its slotted face downwardly exposed.

The idler sprocket 15 is secured at one end of rail 11 to extend downwardly thereof by means of a bent metal bracket 26. This bracket is secured by a screw 27 to one side of the extrusion comprising rail 11. As noted from FIG. 2 of the drawing, bracket 26 extends outwardly and then vertically downwardly a few inches below rail 11. At the lower end of the downwardly extending portion of bracket 26, a horizontally positioned pin 28 serving as the axle of idler sprocket 15 is provided. This pin is orthogonal with respect to the longitudinal dimension of rail 11 so that sprocket 15 rotates in a vertical plane that is aligned with rail 12.

Drive sprocket 14 is mounted in a similar manner at the opposite end of rail 11 and is aligned with idler sprocket 15 so that the two sprockets 14 and 15 may carry chain 12.

Motor 13 may be mounted directly to ceiling 25 or to flange 23 adjacent drive sprocket 14. Sprocket 14 may be mounted directly to the shaft of motor 13 or it may be coupled to the motor through a suitable speed reduction means.

Any one of a number of types of chains will be found to perform satisfactorily as conveyor chain 12. The ordinary bicycle chain, for example, would be suitable.

Carrier assembly 16 comprises a support arm 31, a coupling arm 32, wheels or rollers 33 and 34, a cylindrical spacer 34 and a clevis 36.

The support arm 32 is a flat elongated member having one end passing upwardly through the slotted face of rail 11. Rollers 33 and 34 are mounted one on each side of the upward end of arm 31 by means of a cylindrical pin 37 which passes through a hole in the upper end of the arm. Pin 37 serves as an axle for rollers 33 and 34 with rollers 33 and 34 riding on the inside surfaces of the slotted face of rail 11 adjacent slot 38, as shown in the drawing.

Coupling arm 32 is a flat elongated member with a circular hole at one end and a longitudinal slot 39 extending therealong at the other end. A pivot pin 41 passing through the circular hole secures that end of arm 32 to a link 42 of chain 12. Spacer 35 carried by pin 41 is positioned between arm 32 and link 42 to assure a free pivoting motion between the coupled members. Another pivot bolt or pin 43 passes through slot 39 of arm 32 and through a spacing washer 44, a circular hole in the lower end of arm 31 and holes in the two ends of clevis 36 which are positioned on opposite faces or arm 31 in alignment with the circular hole of arm 31. Pin 43 is threadedly secured by a nut 45 at one end thereof. Clevis 36 supports lamp chain 17 and chain 17 carries lamp 18 and its shade 19. Lamp 18 may comprise a metal halide lamp structure.

Sprockets 14 and 15, carrier assembly 16 and bracket 26 are preferably formed of aluminum or other suitable metal, but any part may be formed of a suitable plastic and still fall within the scope of this invention.

OPERATION

In operation, motor 13 drives sprocket 14 and, in turn, chain 12 and idler sprocket 15 at a very low speed such as one RPM. The individual links of chain 12 follow a closed looped path over and around sprocket 14, along a straight horizontal portion thereof to the underside of sprocket 15, around and over sprocket 15 and along another straight horizontal portion to the top of sprocket 14 in a continuous motion. Carrier 16, which is attached to link 42 of chain 12 by arm 32 and pin 41, follows the horizontal motion of link 42, moving first in one direction to one end of the rail 11 and then back to the other end. As carrier 16 is moved back and forth, its weight is supported by arm 31 and rollers 33 and 34. Lamp 18 is thus moved slowly from one end of planter 22 to the other end and back again, the motion being repeated so long as motor 13 remain energized.

FIGS. 3A-3B show the successive positions taken by coupling arm 32 as link 42 passes around sprocket 15. It will be noted that arm 32 rotates approximately 180 degrees in passing around sprocket 15. Slot 39 in which pivot pin 43 operates permits sufficient freedom of movement during this rotation to assure smooth rotational action.

As lamp 18 approaches each individual plant in planter 22, the angle of incidence and the intensity of the light reaching the plant from lamp 18 gradually changes in a manner approximating the changing solar illumination received by a plant in its natural environment. Normal plant growth and development are thus enhanced. Because lamp 18 is able to provide illumination to a larger number of plants located along the length of planter 22, the utilization of lamp 18 is extended beyond that possible with a stationary lamp. Furthermore, because the lamp does not remain stationary over any one plant, there is no excessive heat build-up and no danger of burning, even if the lamp moves very closely over the tops of the plants.

The time required for the lamp to traverse the length of the planter 22 may be adjusted through the control of the motor speed. In the first implementation, the planter length was six feet and the time for a complete traversal from one end to the other and back again was approximately forty minutes.

An improved lighting system for indoor plants is thus provided in accordance with the stated objects of the invention; and although but a single embodiment has been illustrated and described, it will be apparent to those skilled in the art that various changes and modifications may be made therein without departing from the spirit of the invention or from the scope of the appended claims.

I claim:

1. Apparatus for sustaining indoor plant growth comprising:

an elongated rail, said rail comprising a ceiling mountable, hollow, tubular member slotted along its bottom surface, a carriage means supported on said rail for guided movement therealong, said carriage means comprising an elongated arm extending at one end through the slot in said bottom surface, roller means mounted on said one end of said arm inside of said tubular member for support and guided movement of said arm along said rail, means connected to said carriage means for moving said carriage means in a reciprocating manner along said rail, said means comprising an electric motor driven conveyor supported on said rail and attached to said carriage means for moving said carriage means continuously in a straight line along a closed loop path, said conveyor comprising a pair of sprockets one mounted at each end of said rail and an endless chain mounted over said sprockets to form said closed loop path, linkage means pivotally attached to said chain at one end and to said carriage means at the other end to provide continuous movement of said carriage means along said rail, and a light means suspended from said carriage means for moving in a reciprocating manner back and forth over an associated planter.

2. The apparatus set forth in claim 1 wherein:

said electric motor driven conveyor comprises a slow speed electric motor operable at approximately one revolution per minute.

3. The apparatus set forth in claim 2 wherein:

said light means comprises a metal halide lamp mounted in a reflector directing the light rays onto the associated planter.

4. The apparatus set forth in claim 1 wherein: said means connected to said carriage means comprises a slotted link,
one end of said link being attached to said conveyor and the other end of said link receiving in said slot a pin mounted on said arm for movement therealong upon movement of said carriage.

* * * * *